July 6, 1965 E. I. RADZIMOVSKY 3,193,028
ROTARY DRILL BIT
Filed Sept. 26, 1962 4 Sheets-Sheet 1

EUGENE I. RADZIMOVSKY INVENTOR.

BY James E. Reed
ATTORNEY

EUGENE I. RADZIMOVSKY INVENTOR.

BY James E. Reed
ATTORNEY

July 6, 1965　　　　　E. I. RADZIMOVSKY　　　　3,193,028
ROTARY DRILL BIT

Filed Sept. 26, 1962　　　　　　　　　　　　　4 Sheets-Sheet 4

EUGENE I. RADZIMOVSKY　INVENTOR.

BY James E. Reed
　　　　　ATTORNEY

United States Patent Office 3,193,028
Patented July 6, 1965

3,193,028
ROTARY DRILL BIT
Eugene Ivan Radzimovsky, Urbana, Ill., assignor, by mesne assignments, to Esso Production Research Company, Houston, Tex., a corporation of Delaware
Filed Sept. 26, 1962, Ser. No. 226,248
3 Claims. (Cl. 175—372)

The present invention relates to rotary bits useful for drilling boreholes in the earth and is particularly concerned with an improved rock bit less susceptible to bearing failure than rock bits available in the past.

Rock bits employed in the petroleum industry generally have conical cutting elements provided with teeth which make rolling contact with the formation at the bottom of the borehole. Each of these cutting elements or cones is mounted on a cantilever pin by means of a bearing assembly located within the cone. The bearing assembly normally consists of a sleeve bearing mounted near the apex of the cone, a ball bearing provided with races machined in the pin and cone surfaces at an intermediate point along the cone axis, and a roller bearing including similar races located near the base of the cone. Such an assembly has an advantage over most other bearing arrangements in that it provides a convenient means for locking the cone in place. The balls employed in the bearing assembly are inserted into the ball races through a hole in the cone after the cone and the other bearing elements have been positioned on the pin. Plugging of the hole precludes escape of the balls from the bearing races and thus prevents disengagement of the cone from the pin. In spite of this advantage, experience has shown that such an assembly leaves much to be desired. Improvements in cone design and other changes made in rock bits in recent years have increased the life of such bits to a point where bearing failure has become the limiting factor in the use of rock bits. In order to avoid failure of the bearings and loss of the cones and bearing elements in the borehole, it has become the practice to discard rock bits after only a few hours operation, even though the teeth and other parts of the bit are still in operable condition.

One of the principal disadvantages of the conventional bearing assembly described above is that it requires the use of sleeve, ball and roller bearings on the same shaft. The proper functioning of a sleeve bearing depends in part upon there being sufficient radial clearance between the bearing surfaces to permit the maintenance of a lubricating film on the surfaces. The radial clearance initially provided increases as the bearing surfaces wear and hence there is generally considerable play in such a bearing. A ball or roller bearing, on the other hand, requires a tight assembly with essentially no play so that all the balls or rollers are simultaneously in contact with the races. When a sleeve bearing is used in combination with ball and roller bearings on a rock bit, the play in the sleeve bearing results in misalignment of the pin and cone. The rollers, instead of contacting the races over their entire lengths, tend to make contact only at their edges. This results in overstressing of the rollers and accelerates their failure due to metal fatigue. Overstressing of the ball bearing presents similar problems. Moreover, misalignment often produces a wobbling motion of the cone on the pin. This further accelerates overstressing of the bearings and produces a pumping effect which promotes the loss of lubricant from the assembly and leads to contamination of the lubricant by the drilling fluid. If a seal is used, the wobbling motion increases seal maintenance problems.

A further disadvantage of an assembly of the type described is that it requires that a hole be drilled into the ball race and later plugged. This results in a discontinuity in the race. Each time a ball rolls over this discontinuity, local overstressing of the ball and sections of the race adjacent the discontinuity occur. This leads to the formation of minute cracks in the balls and race and eventually produces spalling. Once this commences, failure of the bearing takes place very rapidly. Abrasion caused by particles of metal from the damaged surfaces and scaling due to the generation of high temperatures further increase the rate at which failure occurs.

Still another disadvantage of the conventional bearing assembly lies in the fact that it requires that the races for the ball and roller bearings be machined in the pin and cone surfaces. The metallurgical requirements for a satisfactory bearing race are entirely different from those for a cone or tooth on a drill bit. With the conventional assembly, it is generally necessary to use metals and heat treating techniques which represent a compromise between these requirements. Maximum performance is not obtained from either the bearing race or the cone.

It is therefore an object of the present invention to provide an improved rock bit having a bearing assembly which is more effective than those used on rock bits available in the past. A further object is to provide a rock bit bearing assembly which will prevent misalignment of the pin and cone axes and is thus less susceptible to bearing failure due to metal fatigue, contamination of the lubricant, and seal maintenance difficulties. Another object is to provide a bearing assembly which does not require the use of a "ball plug" and is thus free from local overstressing caused by discontinuities in the races. A further object is to provide a bit including a bearing assembly having races independent of the cone and pin. Still another object is to provide a rock bit which will permit rapid mounting of the cones and bearing assemblies on the pins used to support them. Other objects will become apparent as the invention is described in greater detail hereafter.

In accordance with the invention, it has now been found that many of the difficulties encountered with rock bits available in the past can be avoided by mounting the cones on the supporting pins by means of ball or roller bearing assemblies which include inner races held in place by retaining members connected to the ends of the pins and outer races supported in the cones by retaining members attached to the walls of the cones. Studies have shown that the bearing assemblies of the invention reduce bearing failures due to misalignment of the pin and and cone axes, minimize loss and contamination of the lubricant, reduce overstressing of the bearing elements, permit the use of optimum materials and manufacturing techniques, and provide a simple and convenient system for mounting the cones on the pins. Rock bits provided with such assemblies are therefore generally more reliable and can be used for longer periods than conventional rock bits.

The nature and objects of the invention can best be understood by referring to the following detailed description of several embodiments and to the accompanying drawings in which.

Figure 1:
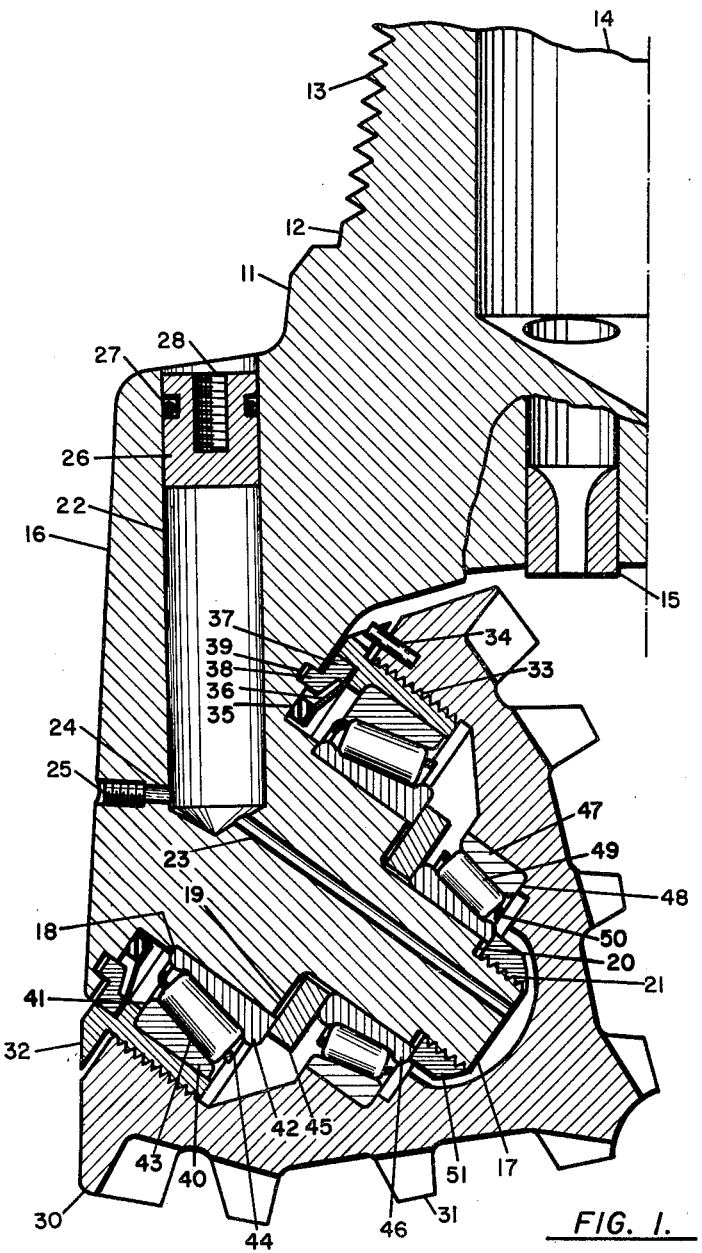
FIGURE 1 is a fragmentary vertical section of a rock bit provided with roller bearings including races held in place by retainers connected to the pins and cones.

The bit depicted in FIGURE 1 of the drawing includes a body 11 provided with an upper shank 12 on which are located external threads 13. The shank and threads form a standard API tool joint by means of which the bit may be connected to the lower end of a rotary drill string. Other connecting means, an API tool joint box for example, may be provided in lieu of the pin if desired. An internal passageway 14 extends downwardly in the body from an opening at the upper end of the shank, not shown, to nozzles 15 in order to permit the discharge of drilling fluid beneath the tool. Only one nozzle is shown in the drawing but two or more nozzles will normally be provided. Legs 16, only one of which appears in the drawing, are spaced at intervals about the body and are tapered to permit the mounting of cones beneath the bit body. A cantilever pin 17 extends downwardly beneath the body from the tapered surface of each leg at an angle of from about 25 to about 45 degrees to the horizontal. Each pin may be an integral part of a leg as shown or may instead be a separate member welded or otherwise affixed to the leg. The pins are provided with shoulders 18, 19 and 20 and are threaded at their outer ends. The threads are indicated by reference numeral 21. Each pin thus decreases in diameter toward its outer end. Only a portion of the bit is shown in FIGURE 1 of the drawing but it will be understood that the complete tool will normally include two or more legs and associated members.

A cylindrical reservoir 22 is preferably provided in each leg of the bit. The reservoir shown in FIGURE 1 of the drawing extends downwardly from an opening in the upper part of the leg. A passageway 23 extends from an opening in the lower part of the reservoir to an outlet in the outer end of the pin. A lateral passageway 24 extends from the bottom of the reservoir to an opening in the outer surface of the leg. A plug 25 is threaded into this passageway. Piston 26 provided with a seal ring 27 set in a groove in the outer surface of the piston is positioned in the reservoir. A threaded hole 28 in the upper part of the piston permits the attachment of a rod so that the piston can be withdrawn from the reservoir.

A conical cutting element or cone 30 provided with external teeth 31 is mounted on pin 17. An annular retainer 32 fitted with a seal assembly is connected to the base of the cone about the pin by threads 33. A locking pin 34 extends through an opening in the retainer into a hole in the cone in order to prevent relative motion of the cone with respect to the retainer. The seal assembly utilized in this embodiment of the bit includes a seal ring 35 of rubber, plastic or other suitable material which is attached to a conical disc spring 36. The disc spring is held in place by a seal retainer 37 which is pressed into a recess in the annular retainer. A lip 38 on the seal retainer extends into a groove 39 in the leg of the bit. This provides a labyrinth which serves to trap abrasive particles in the drilling fluid which might otherwise accelerate wear of the seal ring. The groove in the leg of the bit is concentric with the lip on the seal retainer. The seal ring rotates in a plane parallel to the surface of the leg with which it makes contact and hence an effective seal between the leg and cone is maintained. Other seal assemblies in lieu of that described may be employed. The alignment of the pin and cone achieved with the bearing assembly utilized simplifies sealing problems and makes the use of other seal assemblies feasible.

The bearing arrangement employed on the bit shown in FIGURE 1 of the drawing includes a rear roller bearing mounted near the base of the cone and a front roller bearing located toward the apex of the cone. The rear bearing is provided with a tapered outer race 40 which seats against an internal shoulder 41 on the annular retainer connected to the cone. A tapered inner race 42 is mounted on the pin in contact with shoulder 18 thereon. Tapered rollers 43 are positioned between the tapered races and are spaced by means of a bearing separator 44. Because of the tapered races, the rear bearing takes part of the radial load and all of the thrust load acting from the outer portion of the borehole toward the apex of the cone. The inner race of the rear bearing extends beyond shoulder 19 on the pin and contacts an annular spacer 45 located on the pin adjacent to the shoulder. The front bearing of the assembly includes an inner race 46 which is mounted on the pin in contact with the spacer. The outer race 47 of the front bearing is positioned within the cone in contact with shoulder 48 therein. Tapered races are again employed so that a part of the radial load applied to the cone and all of the thrust load acting from the center of the borehole toward the base of the cone are taken by the front bearing. Rollers 49 are spaced between the races by bearing separator 50. The inner race extends beyond shoulder 20 on the pin. Retaining nut 51 is threaded on the end of the pin in contact with the outer edge of the inner race.

The cone is mounted on the pin as shown in FIGURE 1 of the drawing by first pressing the outer race 40 of the rear bearing into annular retainer 32 so that it contacts shoulder 41 therein. The seal is fixed to the annular retainer by pressing the seal retainer 37 into it. After this has been done, the annular retainer with the seal in place is slipped over pin 17. The inner race 42 of the rear bearing with rollers 43 and separator 44 mounted thereon, is pressed onto the pin so that the inner race 42 makes contact with the shoulder 18. This moves lip 38 of the seal retainer into groove 39 in the leg of the bit. The seal spring 36 is thereby deflected, producing a positive contact between seal ring 35 and the surface of the leg. The annular retainer, seal assembly, and rear bearing assembly are thus mounted in the position shown in FIGURE 1 of the drawing.

The annular spacer 45 is then placed over the pin in contact with the inner race 42 of the rear bearing. The inner race 46 of the front bearing, with the rollers 49 and bearing separator 50, mounted thereon, is pressed on the pin and tightened in place by means of retaining nut 51. Force applied as the nut is tightened is transmitted by spacer 45 to the inner race of the rear bearing so that both bearings are properly seated. Once this has been done, the outer race of the front bearing is pressed into the cone 30 so that it contacts shoulder 48. The cone is then threaded onto the annular retainer so that any play between the pin and cone is eliminated. Pins 34 are pressed into place to prevent loosening of the threaded joint. In lieu of using a threaded connection as described, the retaining nut 51 may be replaced by a ring which can be welded to the end of the pin to hold the inner races of the bearings in place. A welded joint can also be employed between the annular retainer 32 and the cone, rather than a threaded joint as described previously. By placing shims between the annular retainer and the leg of the bit, the cone can be pressed onto the retainer and then welded in place. This eliminates the need for pins 34 and yet assures a tight connection between the cone and annular retainer. When the cone or bearing elements may have to be replaced in the field, however, the use of threaded joints is generally preferred.

Before the bit shown in FIGURE 1 of the drawing is used, the cones and lubricant reservoirs are preferably filled with a grease which melts above the maximum bit operating temperature. Care should be taken to eliminate air bubbles from the grease, since any air in the cavities surrounding the bearings will be compressed when the pressure is increased and will thus make room for the entry of drilling fluid. The grease may be introduced into each cavity by first removing the piston 26 and filling the reservoir. The piston is then replaced and forced downwardly in the reservoir so that grease will flow through passageway 23 into the cavity in the cone. Thereafter, plug 25 is removed from passageway 24, a rod is threaded into opening 28 in the upper part of the piston, and the piston is withdrawn from the reservoir. After the plug has been replaced, the reservoir is refilled and the process is repeated until grease flows out past the seal and labyrinth on the leg of the bit. This assures an adequate supply of grease to the bearings.

During operation of the bit, the pressure in the borehole and that in the cavity surrounding the bearings are substantially equalized by movement of the piston downwardly in the reservoir. Mud fills the space in the reservoir above the piston. Since there is therefore very little pressure differential across the seal and labyrinth, there is little tendency for mud or lubricant to flow past the seal separating the cavity from the space surrounding the tool. The bearing arrangement employed eliminates misalignment problems encountered when sleeve bearings are used on rock bits and thus prevents wobbling of the cones on the pins. This avoids the pumping action which promotes mixing of the drilling fluid and lubricant in conventional bits. Since the clearance between the cone and leg of the bit is small and the base of the cone remains parallel to the leg as the cone rotates, the seal performs more effectively than seals employed in the past.

It will be apparent that the bearing arrangement described has pronounced advantages over those used in conventional rock bits. The arrangement of the invention permits the use of high precision, heavy duty bearings capable of taking the loads to which rock bits are normally subjected. The bearing races can be heat treated to secure maximum bearing life without regard for the metallurgical requirements of the cones. The use of "ball plugs" which interrupt the bearing races is avoided and hence local overstressing of the bearings due to discontinuities in the races is eliminated. The arrrangement permits an initial adjustment of the bearing elements so that any play can be removed and the rollers in both bearings will contact the races over their entire lengths. External loads are supported in the axial as well as the radial direction and hence the need for a third bearing is eliminated. These advantages generally result in considerably better bearing performance than can be obtained with conventional rock bits.

Figure 2:
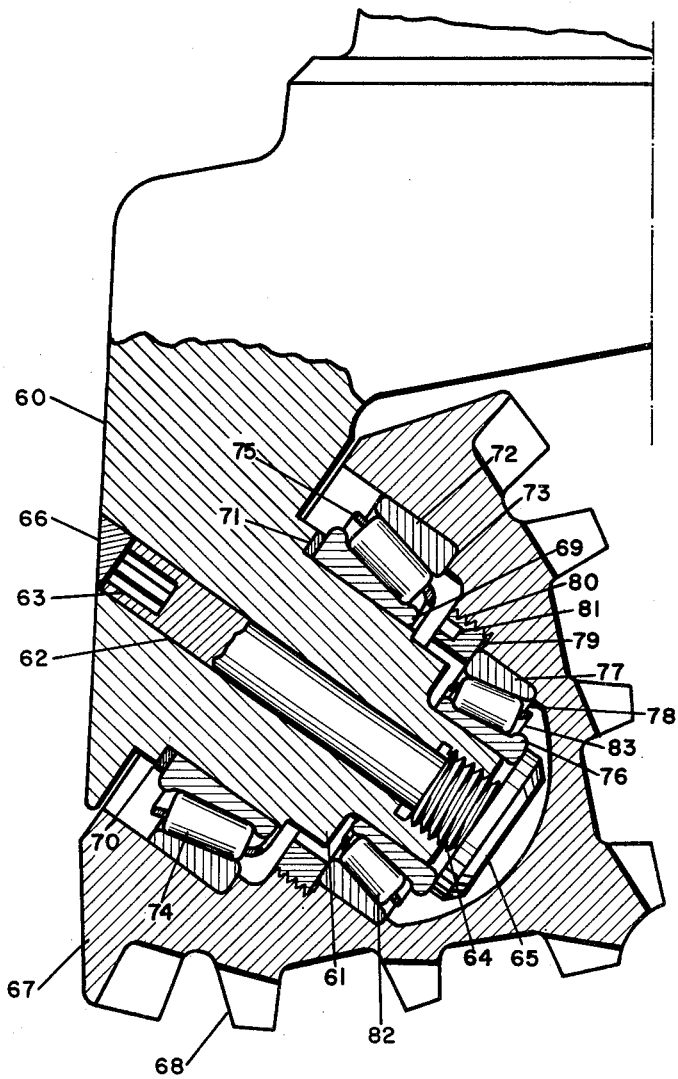
FIGURE 2 is a fragmentary section of a bit showing a modified roller bearing arrangement.

FIGURE 2 of the drawing depicts an alternate embodiment of the invention in which an assembly method somewhat different from that described earlier is employed. The bit of FIGURE 2 includes a leg 60 which extends downwardly from a conventional body and is provided with a pin 61. A hole threaded near the free end of the pin extends through the pin and leg of the bit along the longitudinal axis of the pin. A bolt having an elongated shank 62, a socket 63 in one end of the shank, a short threaded section 64 at the other end of the shank, and a head 65 is held in place in the hole by welding the shank adjacent the socket to the leg of the bit at the outer end of the hole. The weld metal is indicated by reference numeral 66.

Cone 67, provided with external teeth 68, is mounted on the pin by means of front and rear roller bearings. The rear roller bearing includes an inner race 69 positioned near the fixed end of the pin in contact with a spacer 70. The spacer abuts shoulder 71 on the pin. The outer race 72 of the rear bearing is mounted in the cone adjacent an internal shoulder 73. Rollers 74 and bearing separator 75 are located between the inner and outer races. The front roller bearing includes an inner race 76 which is mounted on pin 61 and held in place by the head 65 of the bolt in the pin. The outer race 77 of the front bearing seats against shoulder 78 in the cone and is held in place by annular retainer 79. The retainer may be provided with threads 80 and sockets 81 to permit its installation with a wrench or similar tool or may instead be welded in place. Rollers 82 and bearing separator 83 are positioned between the races. The races of both of the roller bearings are tapered to take radial and axial loads applied to the cone. The bit of FIGURE 2 as shown does not include a seal assembly or lubrication system but it will be apparent that sealing and lubricating means similar to those shown in FIGURE 1 may be employed.

In assembling the bit of FIGURE 2, the outer race 72 of the rear bearing is first pressed into cone 67 so that it contacts internal shoulder 73 in the cone. The bolt is then placed in the cone with the head 65 resting at the bottom of the recess therein. Inner race 76 of the front bearing assembly, with rollers 82 and bearing separator 83 in place, is slipped over the shank of the bolt. The outer race 77 of the front bearing is then pressed into the cone around the inner race and bearing and rollers until it contacts shoulder 78 in the cone. The outer race is held in place by threading retainer 79 into the cone or, alternately, by welding the retainer in place in the cone. Next, spacer 70, the inner race 69 of the rear bearings, rollers 74, and bearing saparator 75 are pressed onto pin 61. The shank 62 of the bolt is then inserted in the longitudinal hole in the pin and the cone, bolt and bearing assemblies are slipped over the pin until the threaded portion 64 of the bolt engages the internal threads in the end of the pin. Thereafter, the cone and attached members are tightened in place by inserting a wrench in socket 63 in the end of the bolt and turning the bolt until the bearings have been seated and play between the pin and cone has been eliminated. Tightening of the screw thus permits the bearings to be readily adjusted. Once the proper adjustment has been obtained, the end of the bolt is welded to the leg of the bit at the point indicated by weld metal 66.

The bit shown in FIGURE 2 of the drawing differs from the earlier embodiment in that the rear bearing is positioned so that it will take axial loads directed from the center of the borehole toward the base of the cone; whereas the rear bearing in the earlier embodiment resists axial forces applied in the opposite direction. Since in both cases the front and rear bearings in combination take loads applied in either direction, either arrangement may be used. The bit of FIGURE 2 is similar to the earlier embodiment in that it minimizes difficulties due to bearing misalignment and overstressing, reduces loss and contamination of the lubricant due to wobbling of the cone, permits the use of uninterrupted bearing races, make possible the selection of proper bearing elements without regard to the cutting and load transmitting requirements imposed on the material used to fabricate the cones, and simplifies bit assembly.

Figure 3:
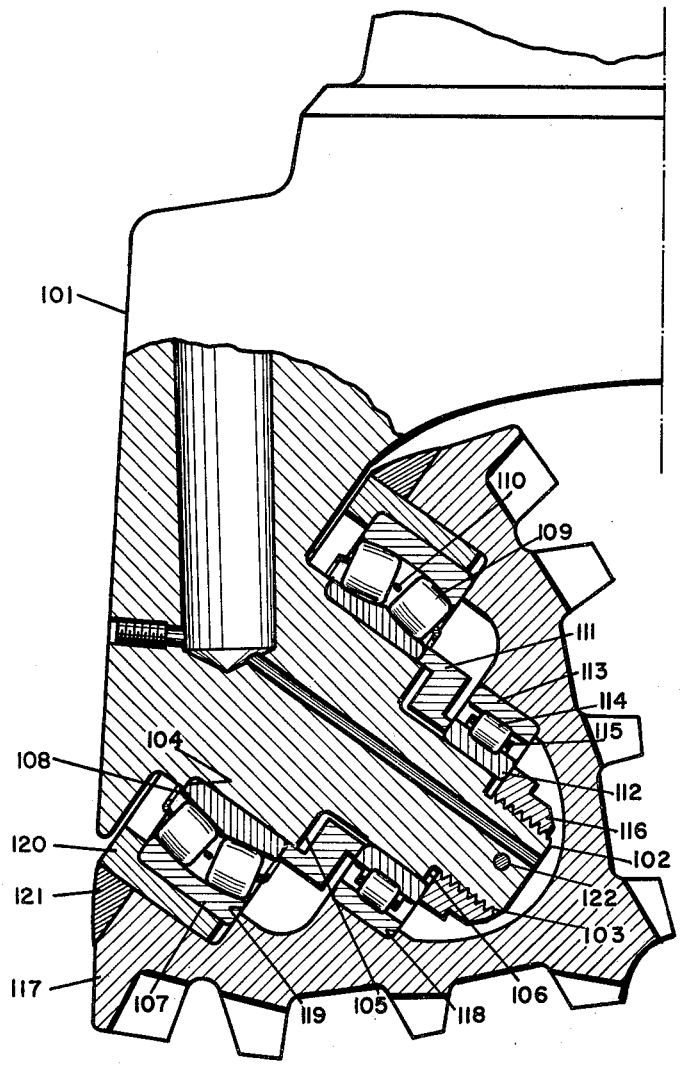
FIGURE 3 is a fragmentary section of a bit illustrating still another arrangement of roller bearings for mounting the cones on the pins; and, FIGURE 4 is a fragmentary section of a bit in which ball bearings are employed to support the cones on the pins.

A further embodiment of the invention is shown in FIGURE 3 of the drawing. The bit of FIGURE 3 includes leg 101 and pin 102 which extends outwardly from the leg. The pin and leg as shown are provided with a lubrication and pressure equalizing system which is identical to that shown in FIGURE 1 and therefore need not be described in detail. A seal assembly of the type described earlier may be used if desired. The pin is provided with external threads 103 at its free end and includes intermediate shoulders 104, 105 and 106. A self-aligning double row roller bearing having a spherical outer race 107, an inner race 108, rollers 109 and separators 110 is mounted on the pin between shoulders 104 and 105. An annular spacer 111 on the pin contacts the inner race of the double row bearing. A cylindrical single row bearing having an inner race 112 and an outer race 113 is located on the pin in contact with the spacer. The rollers and separator of the single row bearing are indicated by reference numerals 114 and 115 respectively. Nut 116 is threaded onto the end of the pin in contact with the portion of the inner race 112 extending beyond shoulder 106. Cone 117 is mounted on the bearings and includes an internal shoulder 118 which contacts the outer race of the single row bearing and a shoulder 119 which seats against the outer race of the double row bearing. A retainer 120 which extends over the outer race of the double row bearing is welded to the base of the cone as indicated by reference numeral 121.

The cone and pin of the bit shown in FIGURE 3 of the drawing are assembled by first pressing the double row roller bearing as a unit into the recess in retainer 120. The double row bearing and retainer are then pressed onto the pin so that the inner race 108 of the bearing seats against shoulder 104 on the pin. Spacer 111 is slipped over the pin so that it contacts the inner race of the bearing. Thereafter, the inner race 112 of the single row bearing, rollers 114 and separator 115 are pressed onto the pin next to the spacer. Nut 116 is then threaded onto the pin to hold inner race 112 in place. The nut may be secured by spot welding it to the pin or by inserting a cotter pin or similar member 122 through a hole extending through the nut end pin. A ring welded to the pin may be used in place of the nut. After the nut or similar member has been secured on the pin, the outer race 113 of the single row bearing is pressed into the cone so that it contacts internal shoulder 118 therein. The cone containing the outer race is then pressed over retainer 120 on the pin until shoulder 119 seats against the outer race of the double row bearing. The cone is secured by welding it to the retainer next to the leg of the bit. Alternatively, the cone and retainer may be threaded together if desired.

The embodiment shown in FIGURE 3 of the drawing utilizes one double row roller bearing and one cylindrical roller bearing in place of the two tapered roller bearings employed in the earlier embodiments. The double row bearing supports most of the radial load and all of the axial load applied to the cone. The capacity in terms of the axial load does not depend upon the direction in which the load is applied. Neither the double row bearing nor the cylindrical bearing requires adjustment and hence assembly of the bit is simple. In addition to these advantages, the embodiment of FIGURE 3 is similar to the earlier embodiments in that it prevents misalignment of the cone and pin, reduces overstressing of the bearing elements, does not impose undue limitations on the matallurgy of the cone and bearing races, and does not require the use of plugs which produce discontinuities in the races.

Figure 4:
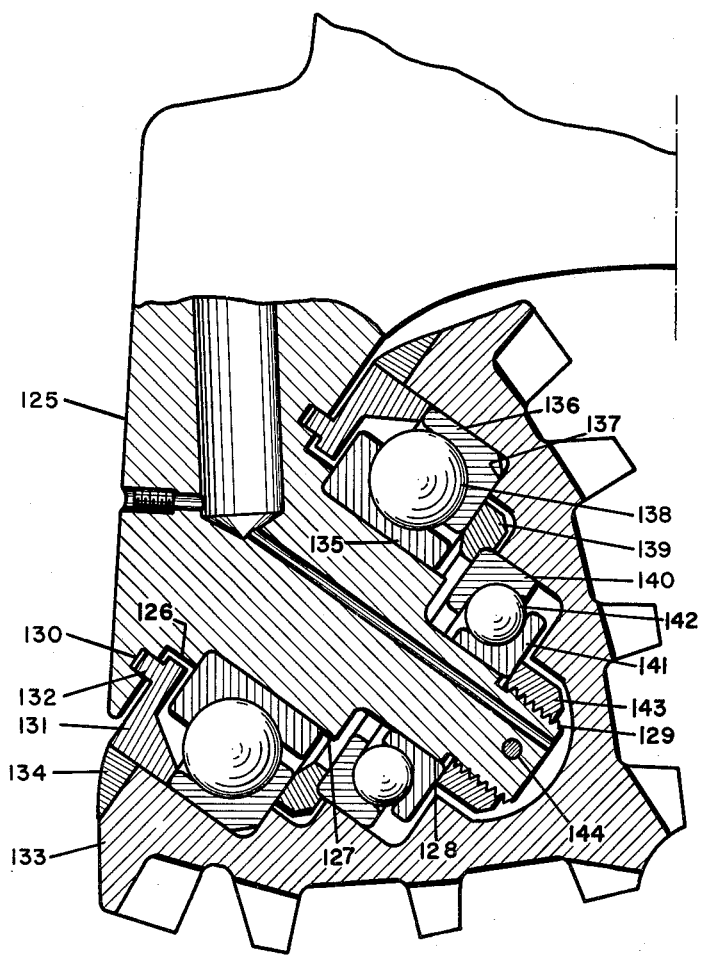

Still another embodiment of the invention is shown in FIGURE 4 of the drawing. This embodiment includes a pin which extends outwardly and downwardly from the leg 125 of the bit. Again a lubrication and pressure equalizing system of the type shown in FIGURE 1 is employed. Since such a system has been described in detail in connection with the earlier embodiment, the description need not be repeated. A seal assembly of the type described earlier may also be utilized if desired. The pin of the bit shown in FIGURE 4 includes a short base section 126 adjacent the leg, a rear bearing section 127 of smaller diameter, a front bearing section 128 which is still smaller in diameter, and a threaded section 129 located at its outer end. An annular groove 130 in the leg of the bit extends around the base section of the pin and is concentric with the pin. An annular retainer member 131 provided with a lip 132 which extends into the groove is welded to the base of cone 133. The weld metal is indicated by reference numeral 134. The rear bearing located within the cone includes an angular inner race 135 mounted on the rear bearing section 127 of the pin. An angular outer race 136 is seated in the cone between internal shoulder 137 and the edge of the retaining member. The races are located so that the bearing surface of the outer race faces the base of the cone and that of the inner race faces the apex of the cone. Balls 138 are positioned between the inner and outer races. An annular spaced 139 which is tapered so that it contacts only the outer race of the rear bearing is mounted on the pin. This spacer contains a recess opposite the tapered face in which the outer race 140 of the front bearing is seated. The front bearing inner race 141 is mounted on the front bearing section 128 of the pin. Angular races 140 and 141 of the front bearing are arranged so that the bearing surface of the inner race faces the base of the cone and that of the outer race faces the cone apex. The balls 142 utilized in the front bearing are positioned between the two races. Retaining member 143 is threaded on the end of the pin so that it contacts the inner race of the front bearing and is secured by a cotter pin or the like 144 which passes through a hole in the pin and retaining member.

Assembly of the apparatus shown in FIGURE 4 of the drawing is carried out by first placing annular retainer 131 over the pin in the position shown in the drawing. The front and rear bearings and the intermediate spacer are then placed on the pin in the proper order. Retaining member or nut 143 is threaded onto the end of the pin and tightened down to produce a tight, slightly prestressed assembly. If desired, a ring may instead be welded to the pin to hold the assembly in place. At this point, the outer races of the bearings are free to rotate about the pin. The retaining member 143 is secured to the pin by means of cotter pin or the like 144. Once this has been done, the cone 133 is slipped over the pin, bearing assembly, and annular retainer 131 and held so that the annular retainer makes firm contact with the outer race of the rear bearing and the outer race is held against shoulder 137 in the cone. The annular retainer and cone are then welded together as indicated by reference numeral 134 to complete the assembly. A threaded connection may be utilized in place of a welded joint if desired.

The rear ball bearing in the assembly of FIGURE 4 supports most of the radial load applied to the cone during operation of the bit and resists axial components of force which tend to move the cone toward the leg of the bit. The axial forces encountered under most drilling conditions act in this direction. A smaller portion of the radial load and any forces which may tend to move the cone off the pin are resisted by the front bearing. The use of two ball bearings in this manner avoids the tendency sometimes exhibited by roller bearings to skew and lock the cone in place. It also makes the bit assembly even less susceptible to misalignment of the pin and cone than the earlier embodiments.

It will be apparent from the foregoing that the invention provides improved rock bits which have numerous advantages over bits employed heretofore. The bearing assemblies utilized in accordance with the invention eliminate the necessity for machining bearing races in the pin and cone surfaces, obviate the requirement for a "ball plug," dispense with the use of sleeve bearings and rolling contact bearings on the same shaft, and reduce the number of bearing elements required. They also make possible the use of better materials and technology which will yield optimum bearing life without limitations imposed by materials used in the cone and pin, permit adjustment of the bearings to eliminate the wobbling and pumping action of the cone, simplify machining of the pin and cone surfaces, permit the use of bearings having relatively large contact areas which are less susceptible to abrasion and metal fatigue than those employed in the past, and provide an improved means for sealing the bearings against loss and contamination of the lubricant. Because of these advantages, rock bits fitted with such bearing assemblies can generally be used somewhat more economically than conventional rock bits.

It will be understood that the invention is not limited to the specific rolling contact bearings shown in the drawing. A variety of different ball and roller bearings may be mounted between the pin and cone in the manner described and used to achieve the advantages outlined above. In like manner, seal assemblies and lubrication systems other than those described in detail in conjunction with FIGURE 1 of the drawing may be employed. The excellent alignment of the pin and cone axes achieved with the bearing assemblies described generally results in considerably better seal performance, regardless of the particular seal assembly used. These and other modifications of the invention will be apparent to those skilled in the art.

What is claimed is:
1. In a rotary drill bit wherein a conical cutting element containing an internal recess is rotatably mounted on a cantilever pin extending into said recess, the improvement which comprises:
   a rear ball bearing mounted in said recess to take axial and radial loads applied to said cutting element, said rear bearing including an angular inner race mounted on said pin in contact with a shoulder near the fixed end thereof, an angular outer race mounted in said recess in contact with an internal shoulder therein and a plurality of balls positioned between said inner and outer races,
   a front ball bearing mounted in said recess to take axial and radial loads applied to said cutting element, said front bearing including an angular inner race mounted on said pin near the free end thereof, an angular outer race mounted in said recess in contact with said cutting element, and a plurality of balls positioned between said inner and outer races,
   an annular spacer positioned about said pin between the outer race of said rear bearing and the outer race of said front bearing,
   means connected to said pin for retaining said front bearing in place,
   and an annular retainer connected to said cutting element adjacent the base of said pin in contact with the outer race of said rear bearing.
2. A rotary drill bit which comprises:
   a body provided with means near the upper end thereof for connecting said bit to the lower end of a rotary drill string and with an internal passageway for discharging drilling fluid beneath said body,
   a leg depending from said body, said leg including a cantilever pin extending inwardly beneath the body,
   a rear ball bearing including an angular inner race mounted on said pin in contact with a shoulder near the fixed end thereof, an angular outer race, and a plurality of balls positioned between said inner and outer races,
   a front ball bearing including an angular inner race mounted on said pin near the free end thereof, an angular outer race, and a plurality of balls positioned between said inner and outer races,
   an annular spacer extending about said pin between and in contact with the outer race of said rear bearing and the outer race of said front bearing,
   a retaining member connected to the free end of said pin in contact with the inner race of said front bearing,
   a conical cutting element containing an internal recess into which said pin extends, said cutting element being mounted on the outer races of said front and rear bearings and said recess including an internal shoulder which limits axial movement of said cutting element with respect to said bearing races,
   and an annular retaining member connected to said cutting element adjacent the base of said pin and extending therein in contact with said outer race of said rear ball bearing.
3. In a rotary drill bit wherein a conical cutting element containing an internal recess is rotatably mounted on a cantilever pin extending into said recess, the improvement which comprises:
   a rear ball bearing mounted in said recess to take axial and radial loads applied to said cutting element, said rear bearing including an angular inner race mounted on said pin adjacent a shoulder thereon with the bearing surface facing the free end of said pin, an angular outer race mounted in contact with the inner wall of said recess adjacent a shoulder therein with the bearing surface facing the fixed end of said pin, and a plurality of ball positioned between the bearing surfaces of said inner and said outer races,
   a front ball bearing mounted in said recess to take axial and radial loads applied to said cutting element, said front bearing including an angular inner race mounted on said pin with the bearing surface facing the fixed end of said pin, an angular outer race mounted in contact with the inner wall of said recess with the bearing surface facing the free end of said pin, and a plurality of balls positioned between the bearing surface of said inner race and the bearing surface of said outer race,
   an annular spacer positioned about said pin between the outer race of said rear bearing and the outer race of said front bearing,
   an annular retainer connected to the free end of said pin in contact with the inner race of said front bearing,
   and an annular retainer connected to said cutting element adjacent the base of said pin in contact with the outer race of said rear bearing.

References Cited by the Examiner
UNITED STATES PATENTS

| 1,909,128 | 5/33 | Scott | 175—356 X |
| 2,076,000 | 4/37 | Reed | 308—8.2 |
| 2,210,077 | 8/40 | Hanly | 308—8.2 |
| 2,787,502 | 4/57 | Huckshold | 175—367 X |
| 3,007,751 | 11/61 | Eenink. | |
| 3,096,835 | 7/63 | Neilson | 175—371 |

FOREIGN PATENTS 1,053,319  9/53  France.

CHARLES E. O'CONNELL, *Primary Examiner.*
BENJAMIN BENDETT, *Examiner.*